UNITED STATES PATENT OFFICE 2,543,266

ACYLAMIDO-ACETOBIPHENYLS

Louis L. Bambas, Grosse Pointe Woods, Mich., assignor to Parke, Davis & Company, Detroit, Mich., a corporation of Michigan No Drawing. Application January 4, 1950, Serial No. 136,832

6 Claims. (Cl. 260—558)

This application is a continuation in part of my co-pending application, Serial Number 83,778, filed March 26, 1949, now U. S. Patent 2,516,098, and the invention relates to acyl derivatives of certain ketonic amines and to methods for obtaining the same. More particularly, the invention relates to acylamido ketones of the biphenyl series having the formula,

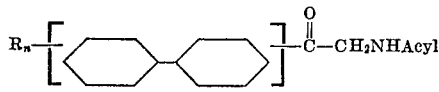

where $n$ is 1 or 2, and R is the same or different and represents hydrogen, halogen, nitro, lower alkyl, or lower alkoxy radicals. The term "acyl" as used herein includes saturated and unsaturated lower aliphatic acyl, halogen substituted lower aliphatic acyl, carboxy substituted lower aliphatic acyl, cyano substituted lower aliphatic acyl, ether substituted lower aliphatic acyl, hydroxy substituted lower aliphatic acyl, ester substituted lower aliphatic acyl, benzoyl, substituted benzoyl, araliphatic acyl, furoyl, pyridinoyl and the like radicals.

In accordance with the invention, the biphenylyl acylamidomethyl ketones of the formula given above are prepared from the mineral acid addition salts of biphenylyl aminomethyl ketones of formula,

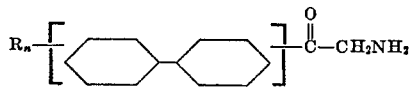

where R and $n$ have the same significance as given above.

The transformation may be illustrated diagrammatically as follows:

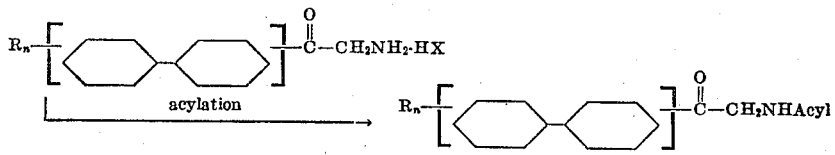

where R and $n$ have the same significance as given above and where X is an organic or inorganic anion. In carrying out this acylation an acid addition salt of the biphenylyl aminomethyl ketone must be employed as the starting material since the free bases of these amino ketones are rather unstable. However, in order for the acylation reaction to take place the biphenylyl aminomethyl ketone compound must be in the form of its free base or an organic acid addition salt and it is, therefore, necessary to generate simultaneously the free base or the organic acid addition salt in the reaction mixture and to acylate it. This is accomplished by carrying out the reaction in the presence of a weakly alkaline substance such as an alkaline metal salt of an organic acid, an alkali or an alkaline earth metal carbonate, a tertiary organic base, a hydroxide of an amphoteric metal, calcium hydroxide and the like. Some specific examples of such weakly alkaline substances are sodium acetate, sodium bicarbonate, potassium bicarbonate, sodium carbonate, calcium carbonate, magnesium carbonate, pyridine, quinoline, triethylamine and aluminum hydroxide.

As acylating agents acyl halides or acyl anhydrides can be employed in conjunction with either aqueous or non-aqueous reaction media.

The temperature of the recation is not particularly critical and can be varied over a considerable range without any significant deleterious effect upon the yields of the final products. In general, temperatures varying from 0° C. to at least 110° C. can be used although when a non-aqueous reaction mixture is employed the temperature can be increased if desired.

The invention is illustrated by the following examples:

Example 1

125 g. of 4-biphenylyl aminomethyl ketone hydrochloride is dissolved in 500 cc. of glacial acetic acid and 300 cc. of acetic anhydride. 150 g. of sodium acetate is added in small portions with stirring. After the addition has been completed, the solution is diluted with water and the 4-biphenylyl acetamidomethyl ketone which separates is collected and recrystallized from methanol; M. P. 154–5° C. The formula of this compound is,

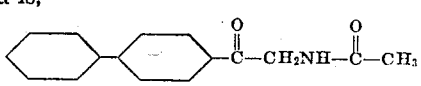

Example 2

A mixture consisting of 15 g. of 3-biphenylyl aminomethyl ketone hydrochloride, 50 g. of benzoic anhydride and 6 g. of sodium acetate is heated to about 45° C. and stirred as small amounts of ice and water are added from time to time. After about one hour the mixture is diluted with 300 cc. of water, cooled, adjusted to pH 8 with sodium hydroxide, and the desired 3-biphenylyl benzamidomethyl ketone collected. The product, which is washed with water and dried in vacuo, has the formula,

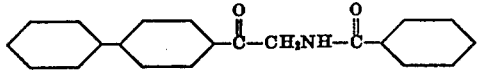

Example 3

30 g. of 4'-methoxy-4-biphenylyl aminomethyl ketone hydrochloride is added in small portions to a mixture consisting of 40 g. of dry pyridine and 30 g. of phenyl acetyl chloride, keeping the temperature below about 5° C. After stirring for about one hour, 700 cc. of cold water is added and the precipitated product collected. The product thus obtained is 4'-methoxy-4-biphenyl phenylacetamidomethyl ketone of the formula,

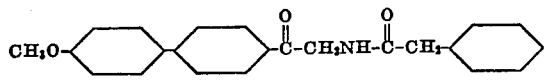

Example 4

130 g. of the hydrochloride salt of 4'-nitro-4-biphenylyl aminomethyl ketone is added to 250 cc. of glacial acetic acid and 150 cc. of acetic anhydride. 75 g. of sodium acetate is added slowly with stirring and the mixture stirred for about one-half hour. The reaction mixture is diluted with water and the precipitated product collected. Recrystallization from methanol yields the desired 4'-nitro-4-biphenylyl acetamidomethyl ketone in pure form. The formula of this product is,

Example 5

10 g. of 4'-nitro-4-biphenylyl aminomethyl ketone hydrochloride is added to 30 c. of glacial acetic acid, and 20 cc. of dichloroacetic anhydride. 10 g. of sodium acetate is added slowly with stirring and the mixture is stirred for about three-quarters of an hour. The reaction mixture is diluted with water and the precipitated product collected. Recrystallization from methanol yields the desired 4'-nitro-4-biphenylyl dichloroacetamidomethyl ketone in pure form. The formula of this product is,

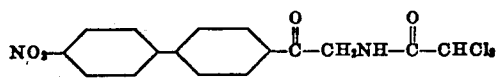

Example 6

A mixture consisting of 18 g. of 4'-nitro-4-biphenylyl aminomethyl ketone hydrochloride, 50 g. of benzoic anhydride, and 6 g. of sodium acetate is heated to about 45° C. and stirred as small amounts of ice water are added from time to time. After about one hour the mixture is diluted with 300 cc. of water, cooled, adjusted to pH 8 with sodium hydroxide and the desired 4'-nitro-4-biphenylyl benzamidomethyl ketone is collected. The product which is washed with water and dried in vacuo has the formula,

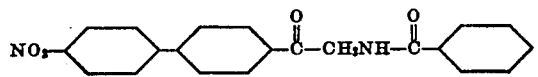

Example 7

A mixture consisting of 48 g. of 4'-iodo-4-biphenylyl aminomethyl ketone hydrochloride, 150 g. of benzoic anhydride, and 18 g. of dry sodium acetate is heated to about 45° C. and stirred as small amounts of water and ice are added from time to time. After about one hour the mixture is diluted with 1 liter of water, cooled and adjusted to pH 8 with sodium hydroxide. The 4'-iodo-4-biphenylyl benzamidomethyl ketone which separates is collected, washed with water and dried. This product has the formula,

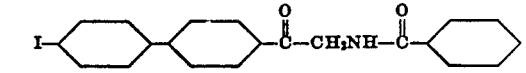

Example 8

A mixture consisting of 100 g. of 2'-methyl-4-biphenylyl aminomethyl ketone sulfate, 150 g. of p-toluyl anhydride and 18 g. of dry potassium carbonate is heated to about 40° C. and stirred as small quantities of water are added. After stirring for about two hours, the mixture is diluted with 1 liter of ice water, cooled and the pH adjusted to about 8 with potassium hydroxide solution. The insoluble 2'-methyl-4-biphenylyl p-toluylamidomethyl ketone is collected, washed with water, and dried in vacuo. The formula of this product is,

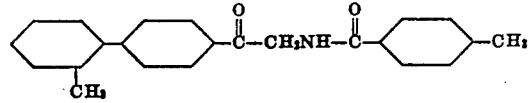

Example 9

5 g. of 4'-nitro-6-methyl-4-biphenylyl aminomethyl ketone hydrochloride is added to 10 g. of methoxyacetic anhydride and 10 ml. of dry pyridine. The mixture is warmed at 70° C. for one-half hour and then diluted with water and the precipitated 4'-nitro-6-methyl-4-biphenylyl methoxyacetamidomethyl ketone is collected. This product which has the formula,

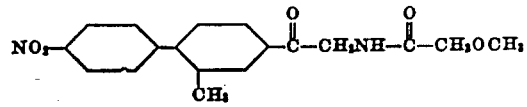

may be purified by recrystallization from methanol.

Example 10

3 g. of 4-biphenylyl aminomethyl ketone hydrochloride is added in small portions to a mixture consisting of 4 g. of dry pyridine and 3 g. of crotonyl chloride, keeping the temperature below about 5° C. After stirring for about one hour 70 cc. of cold water is added and the precipitated product is collected. The product thus obtained is 4-biphenylyl crotonylamidomethyl ketone of the formula,

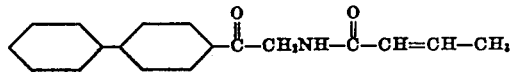

Example 11

A mixture consisting of 15 g. of 4-biphenylyl aminomethyl ketone hydrochloride, 20 g. of succinic anhydride and 6 g. of sodium acetate is heated to about 45° C. and stirred as small amounts of ice and water are added from time to time. After about one hour the mixture is diluted with 250 cc. of water, cooled, adjusted to pH 8 with potassium hydroxide and the desired 4-biphenylyl succinamidomethyl ketone collected. The product which is washed with water and dried in vacuo has the formula,

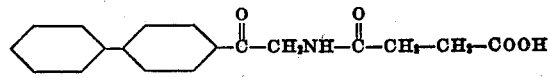

Example 12

28 g. of 4-biphenylyl aminomethyl ketone hydrochloride is added in small portions to a mixture consisting of 35 g. of dry pyridine and 20 g. of cyanoacetyl chloride, keeping the temperature below about 5° C. After stirring for about one hour, 500 cc. of cold water is added and the precipitated product is collected. The product thus obtained is 4-biphenylyl cyanoacetamidomethyl ketone of the formula,

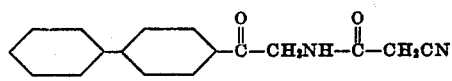

Example 13

4 g. of 4-biphenylyl aminomethyl ketone hydrochloride is added in small portions to a mixture consisting of 10 g. of dry pyridine and 3 g. of acetoxyacetyl chloride, keeping the temperature below about 10° C. After stirring for about one hour, 100 cc. of cold water is added and the precipitated product is collected. The product thus obtained is 4-biphenylyl acetoxyacetamidomethyl ketone of the formula,

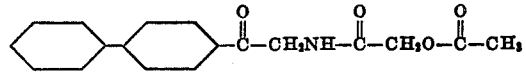

Example 14

12 g. of 4-biphenylyl aminomethyl ketone hydrochloride is added in small portions to a mixture consisting of 20 g. of dry pyridine and 10 g. of furoyl chloride, keeping the temperature below about 5° C. The mixture is stirred for about one hour and 250 cc. of cold water is then added. The precipitated product which has the formula,

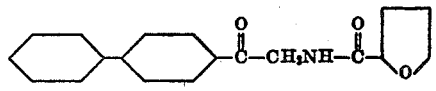

is collected and dried in vacuo.

Example 15

20 g. of 4-biphenylyl aminomethyl ketone hydrochloride is added in small portions to a mixture consisting of 30 g. of dry pyridine and 10 g. of nicotinoyl chloride, keeping the temperature below about 5° C. After stirring for about one hour, 600 cc. of cold water is added and the precipitated product, 4-biphenylyl nicotinamidomethyl ketone, which has the formula,

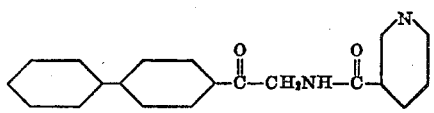

is collected.

Example 16

A mixture of 10 g. of 4-biphenylyl aminomethyl ketone hydrochloride and 15 g. of methyl lactate is heated on a steam bath for three hours. After the evolution of methanol has ceased, 500 cc. of cold water is added. The product which precipitates is 4-biphenylyl lactamidomethyl ketone of the formula,

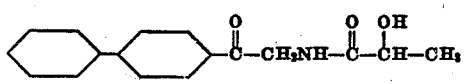

Example 17

10 g. of 4-biphenylyl aminomethyl ketone hydrochloride is added to 30 cc. of glacial acetic acid, and 20 cc. of dichloroacetic anhydride. 10 g. of sodium acetate is added slowly with stirring and the mixture is stirred for about three-quarters of an hour. The reaction mixture is diluted with water and the precipitated product collected. Recrystallization from methanol yields the desired 4-biphenylyl dichloroacetamidomethyl ketone in pure form. The formula of this product is,

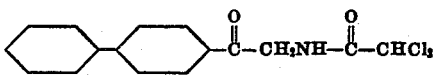

Example 18

30 g. of 4-biphenylyl aminomethyl ketone hydrochloride is added in small portions to a mixture consisting of 40 g. of dry pyridine and 30 g. of benzoyl chloride, keeping the temperature below about 5° C. After stirring for about one hour, 700 cc. of cold water is added and the precipitated product collected. The product thus obtained is 4-biphenylyl benzamidomethyl ketone of the formula,

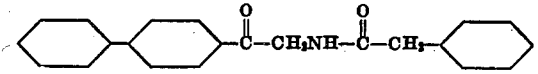

The biphenylyl aminomethyl ketone acid addition salts used as the starting materials in the practice of the invention can be prepared according to the following method:

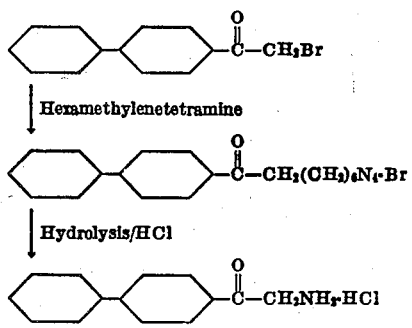

For example, 4-biphenylyl aminomethyl ketone hydrochloride, used as the starting material in Example 1 may be prepared as follows:

(a) 75 g. of hexamethylenetetramine dissolved in chloroform is added to 125 g. of 4-biphenylyl bromomethyl ketone and the mixture allowed to stand at room temperature for about three hours. The 4-biphenylyl bromomethyl ketone-hexamethylenetetramine complex is collected, washed with a little chloroform and dried. The formula of this product is,

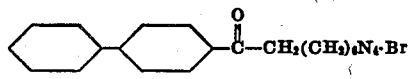

(b) 175 g. of the 4-biphenylyl bromomethyl ketone-hexamethylenetetramine complex is added to 200 cc. of concentrated hydrochloric acid and 1 liter of absolute ethanol and the mixture is stirred overnight. The insoluble hydrochloride salt of 4-biphenylyl aminomethyl ketone is collected by filtration, washed with a small amount of cold water and dried at room temperature. The formula of this product is,

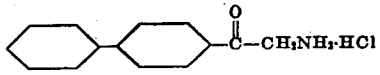

Some of the subject matter disclosed but not claimed herein is described and claimed in my copending application Serial No. 136,831, filed January 4, 1950, as a continuation-in-part of my application Serial No. 83,778, now Patent No. 2,516,098.

What I claim is:
1. A compound of formula,

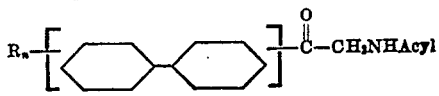

where $n$ is one of the integers 1 and 2 and R is a member of the class consisting of hydrogen, halogen, $-NO_2$, lower alkyl, and lower alkoxy radicals.

2. 4-biphenylyl acetamidomethyl ketone.
3. 4-biphenylyl dichloroacetamidomethyl ketone.
4. 4-biphenylyl benzamidomethyl ketone.
5. 4'-nitro-4-biphenylyl acetamidomethyl ketone.
6. 4' - nitro - 4 - biphenylyl dichloroacetamidomethyl ketone.

LOUIS L. BAMBAS.

No references cited.